(12) United States Patent
Perahia et al.

(10) Patent No.: US 9,404,748 B2
(45) Date of Patent: Aug. 2, 2016

(54) ELECTRIC GRADIENT FORCE DRIVE AND SENSE MECHANISM FOR A MICRO-ELECTRO-MECHANICAL-SYSTEM GYROSCOPE

(71) Applicant: HRL LABORATORIES, LLC, Malibu, CA (US)

(72) Inventors: Raviv Perahia, Los Angeles, CA (US);
Hung Nguyen, Los Angeles, CA (US);
Deborah J. Kirby, Calabasas, CA (US);
Srikanth S. Iyer, Calabasas, CA (US);
David T. Chang, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 326 days.

(21) Appl. No.: 13/930,769

(22) Filed: Jun. 28, 2013

(65) Prior Publication Data
US 2015/0000401 A1    Jan. 1, 2015

(51) Int. Cl.
*G01C 19/56* (2012.01)
*G01C 19/5755* (2012.01)
*G01P 15/125* (2006.01)
*G01C 19/5726* (2012.01)

(52) U.S. Cl.
CPC ........ *G01C 19/5755* (2013.01); *G01C 19/5726* (2013.01); *G01P 15/125* (2013.01)

(58) Field of Classification Search
CPC ........... G01C 19/5755; G01C 19/5726; G01C 19/56–19/5698; G01P 15/18; G01P 15/125; G01P 15/0802
USPC .............. 73/504.12, 504.13, 504.04, 514.32, 73/514.36–514.38; 324/661
See application file for complete search history.

(56) References Cited

U.S. PATENT DOCUMENTS

| | | | |
|---|---|---|---|
| 4,655,081 A * | 4/1987 | Burdess | G01C 19/567 310/329 |
| 2004/0239341 A1* | 12/2004 | Aoyagi et al. | 324/661 |
| 2010/0000324 A1* | 1/2010 | Yoshikawa et al. | 73/514.32 |
| 2010/0314969 A1* | 12/2010 | Gaidarzhy et al. | 310/321 |
| 2013/0104653 A1* | 5/2013 | Bernstein | G01C 19/5691 73/504.13 |
| 2013/0214461 A1* | 8/2013 | Shkel et al. | 264/572 |

OTHER PUBLICATIONS

Kuhns, Design and Fabrication of a Micromechanical Gyroscope Thesis, Jun. 17, 1996, Pertinent Section: Chapter 5.*
Zhiyong et al, Ultra-Low Noise Charge Sensitive Amplifier for MEMS Gyroscope, 2009.*

(Continued)

*Primary Examiner* — Peter Macchiarolo
*Assistant Examiner* — David L Singer
(74) *Attorney, Agent, or Firm* — Ladas & Parry (57) ABSTRACT

An apparatus for driving and sensing motion in a gyroscope including a dielectric mass, an anchor, a spring coupled between the anchor and the dielectric mass, a substrate adjacent the dielectric mass, an insulator layer on the substrate, and a first electrode and a second electrode on the insulator layer. When an alternating current voltage is applied between the first and second electrodes, an electric field gradient is generated in the dielectric mass and causes the dielectric mass to move relative to the anchor. When the dielectric mass has motion relative to the anchor and a voltage is applied between the first and second electrodes, the movement of the dielectric mass generates a current at the first and second electrodes proportional to the motion.

25 Claims, 5 Drawing Sheets

(56) References Cited

OTHER PUBLICATIONS

Unterreithmeier, Q. P., Weig, E. M., & Kotthaus, J. P. In "Universal transduction scheme for nanomechanical systems based on dielectric forces" *Nature*, vol. 458, pp. 1001-1003, 2009.

Kwan H. Lee, T. G. in "Cooling and control of a cavity optoelectromechanical system" *Phys. Rev. Lett.*, vol. 104, 123604 2010.

Griffiths, D. J. (1999). *Introduction to Electrodynamics*. Saddle River: Prentice Hall, pp. 179-196.

* cited by examiner

ELECTRIC GRADIENT FORCE DRIVE AND SENSE MECHANISM FOR A MICRO-ELECTRO-MECHANICAL-SYSTEM GYROSCOPE

CROSS REFERENCE TO RELATED APPLICATIONS

None

TECHNICAL FIELD

This disclosure relates to gyroscopes and to micro-electrical mechanical systems (MEMS).

BACKGROUND

State-of-the-art MEMS vibratory gyroscopes typically use metal electrodes placed directly in contact with the mechanical resonator structure or the resonant structure itself is fabricated from conducting or semiconducting materials. When metal electrodes are used, the high mechanical quality factor (Q) of the resonator is spoiled and fabrication tolerance of the metal contacts reduces the symmetry of the resonator. Both reduction in Q and symmetry reduce the gyroscope sensitivity and increase bias drift, sometimes by orders of magnitude. When conducting or semiconducting materials are used, such as Si, Ni, and so on, the gyroscope either suffers from mechanical loss of the material or inherent asymmetry due to asymmetry of crystalline materials.

Several experimental groups have recently realized that an electric gradient force can be used to effectively drive nanomechanical devices. Unterreithmeier, Q. P., Weig, E. M., & Kotthaus, J. P. in "Universal transduction scheme for nanomechanical systems based on dielectric forces" Nature, Vol 458, pp: 1001-1003, 2009 describe that an electric gradient force may be used to drive cantilevers. Kwan H. Lee, T. G. in "Cooling and control of a cavity optoelectromechanical system" Phys. Rev. Lett., Vol 104, 123604 2010 describe how an electric gradient force may be used to control a cavity. The physical description of the electric gradient force and method for calculating it is found in standard physics textbooks, such as Griffiths, D. J. (1999). Introduction to Electrodynamics. Saddle River: Prentice Hall.

While this prior art has focused on nano-mechanical structures, electric gradient forces have not been applied to larger micro scale inertial sensors.

What is needed is a MEMS gyroscope with tactical and navigation grade performance. Also needed are MEMS gyroscopes that are low cost and have a small size and low power and weight. The embodiments of the present disclosure answer these and other needs.

SUMMARY

In a first embodiment disclosed herein, an apparatus for driving and sensing motion in a gyroscope comprises a dielectric mass, an anchor, a spring coupled between the anchor and the dielectric mass, a substrate adjacent the dielectric mass, an insulator layer on the substrate, and a first electrode and a second electrode on the insulator layer, wherein when an alternating current voltage is applied between the first and second electrodes, an electric field gradient is generated in the dielectric mass and causes the dielectric mass to move relative to the anchor, and wherein when the dielectric mass has motion relative to the anchor and a voltage is applied between the first and second electrodes, the movement of the dielectric mass generates a current at the first and second electrodes proportional to the motion.

In another embodiment disclosed herein, a gyroscope for sensing a rotation rate about a z axis comprises a mass spring system comprising a dielectric mass, a first anchor oriented in an x axis normal to the z axis, a first spring coupled between the first anchor and the dielectric mass, a second anchor oriented in a y direction orthogonal to the z axis and the x axis, and a second spring coupled between the second anchor and the dielectric mass, a first substrate adjacent the dielectric mass in the x direction opposite the first anchor, a first insulator layer on the first substrate and a first electrode and a second electrode on the first insulator layer, a second substrate adjacent the dielectric mass in the y direction opposite the second anchor, a second insulator layer on the second substrate, and a third electrode and a fourth electrode on the second insulator layer, wherein when an alternating current voltage is applied between the first and second electrodes, an electric field gradient is generated in the dielectric mass and causes the dielectric mass to move relative to the first and second anchors, and wherein when a voltage is applied between the third and fourth electrodes, the movement of the dielectric mass generates a current at the third and fourth electrodes proportional to the motion.

In yet another embodiment disclosed herein, a micro-electrical mechanical systems (MEMS) gyroscope comprises a dielectric micro-shell, a first set of drivers comprising a first driver on a side of a periphery of the dielectric micro-shell, and a second driver on a side of the periphery of the dielectric micro-shell opposite the first driver, a second set of drivers located at a 90 degree rotation along the periphery of the dielectric micro-shell from the first set of drivers comprising a third driver on one side of the periphery of the dielectric micro-shell, and a fourth driver on a side of the periphery of the dielectric micro-shell opposite the third driver, wherein each driver is actuated by an alternating current voltage between electrodes in the driver, wherein the first set and second set of drivers are driven out of phase with each other to excite a wineglass vibrational mode in the dielectric micro-shell, wherein the drivers and sensors are not on the micro-shell, and wherein the resonant frequency of the micro-shell ranges from 10 KHz to 500 KHz.

In still another embodiment disclosed herein, a gyroscope comprises a dielectric mass, a driver adjacent the dielectric mass, the driver configured to generate an electrical gradient force drive that extends into the dielectric mass, and a sensor adjacent the dielectric mass, the sensor configured to sense movement in the dielectric mass by change of an electrical gradient in the dielectric mass.

These and other features and advantages will become further apparent from the detailed description and accompanying figures that follow. In the figures and description, numerals indicate the various features, like numerals referring to like features throughout both the drawings and the description.

DETAILED DESCRIPTION

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

In this disclosure, a drive and sense mechanism is described that uses an electric field gradient exerted across regions of a Coriolis sensitive micro-electro-mechanical-system (MEMS) structure to create a rotation rate sensor, otherwise known as a gyroscope. Central to the mechanism is a design where the electrodes that generate the electric fields are completely mechanically separated and isolated from the vibrating structure in the gyroscope. A time varying electric field gradient across the drive region of a MEMS mechanical resonator is generated by an alternating current (AC) electrical signal. The time varying electric gradient generates a time varying force that vibrates the structure at or near its mechanical resonant frequency. When the vibrating structure experiences rotation, the Coriolis force couples motion to a sense region of the structure. The sense region motion is detected by another field applied to the structure.

A gyroscope according to this disclosure has two modes of operation: open and closed loop. In open loop operation, a rotation and rotation rate are detected by sensing the vibration of the sense region of the gyroscope through a current generated at the electrodes. In closed loop operation the motion of the sense region is detected and nulled by another field. The magnitude of the electrical signal needed to null the force is a measure of the rotation and rotation rate.

Figure 1:
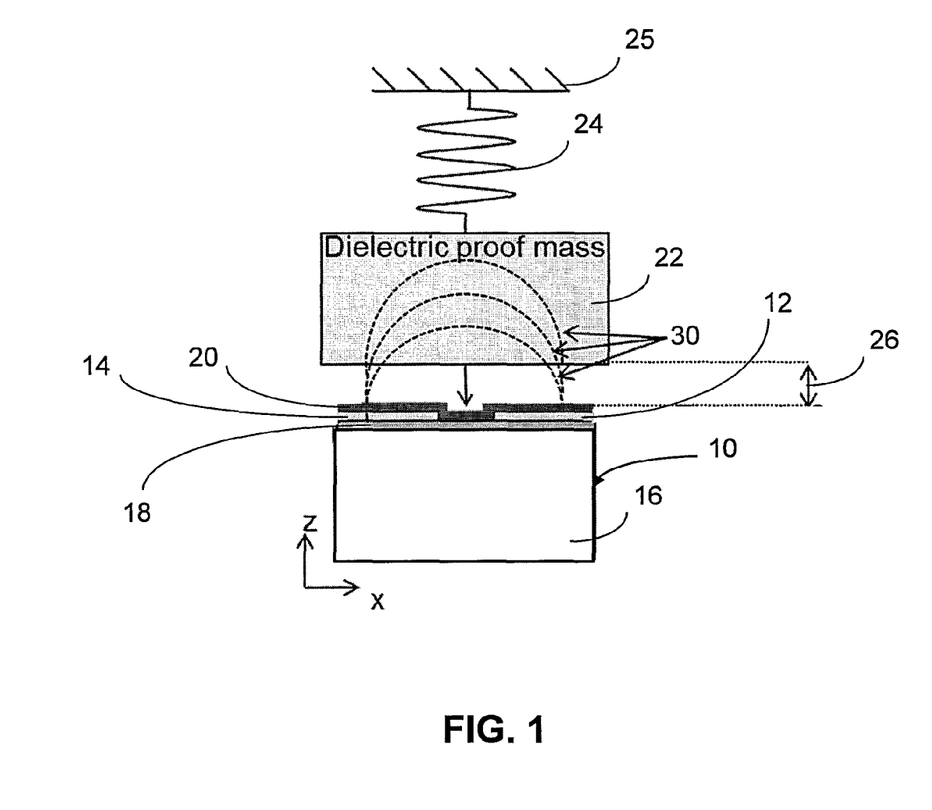
FIG. 1 shows an electric gradient drive and sense mechanism for driving and sensing motion of a mass in accordance with the present disclosure.

FIG. 1 shows the principle of operation for driving and sensing motion in a mass in accordance with this disclosure. An electric gradient drive and sense mechanism 10 has two electrodes 12 and 14 that are fabricated adjacent one another on a substrate 16. The two electrodes 12 and 14 are insulated by an insulating layer 18 from the substrate 16 to prevent current leakage through the substrate 16. A dielectric layer 20 may cover the electrodes 12 and 14 in order to increase the breakdown voltage between the two electrodes 12 and 14.

A proof mass 22 is fabricated from a dielectric material and attached to a spring or springs 24, anchored to anchor 25, creating a mass-spring system. As shown in FIG. 1 the proof mass 22 is within a distance 26 of the electric gradient drive and sense mechanism 10. The proof mass-spring system, which is composed of proof mass 22 and spring 24, is a mechanical resonator with a resonant frequency ($f_r$) and mechanical quality factor (Q).

The spring 24 supports the proof mass 22 away from the anchor 25 and suspended above the substrate 16. In addition, the anchor 25, spring 24 and proof mass 22 may all be fabricated from the same or different dielectric materials. One embodiment may be a silica resonator where the spring 24 and the proof mass 22 are fabricated from the same piece of silica by thinning the quartz and shaping the silica by etching using Deep Reactive Ion Etching. A preferred dielectric material is $SiO_2$ or SiN.

The proof mass 22 shown in FIG. 1 is rectangular; however, the proof mass 22 may be any other shape, such as round or circular. The dimensions of the proof mass 22, springs 24 and anchor 25, combined, are on the order of 10s of microns to several millimeters. The resonant frequency of the spring mass system may be 1 KHz to 500 KHz.

In order to drive the proof mass 22, an alternating current (AC) voltage is applied between electrodes 12 and 14. The electrodes 12 and 14 are separated from the proof mass 22. The electrodes 12 and 14 may be located on the substrate 16 or anchor 25. In the prior art, either the electrodes were on the proof mass, which results in a distorted resonant frequency, or the operating frequency was in the MHz regime, well above the operating frequencies of 1 KHz to 500 KHz in the present disclosure.

The AC voltage generates an electric field gradient 30 that extends into the dielectric proof mass 22. The electric field gradient 30 polarizes the dielectric proof mass 22 and creates a force that draws the proof mass 22 towards the electrodes 12 and 14. An AC electrical signal with frequency matching or near the resonant frequency of the mechanical resonator will lead to sustained large amplitude oscillations of the proof mass 22.

The electric gradient drive and sense mechanism 10 may also be used to sense motion in the mass 22. The sense mode of the electric gradient drive and sense mechanism is complementary to the drive mode. A direct current (DC) voltage is applied between electrode 12 and electrode 14 creating a charged capacitor. When the proof mass 22 vibrates, the capacitance changes in proportion to the motion and generates a current, which is proportional to the motion. In an open loop mode, a rotation in the z-axis is sensed by measuring the current between the electrode 12 and 14 by using a low noise amplifier. In a closed loop mode, the motion of the proof mass 22 is nulled by applying an AC signal between the electrodes 12 and 14. The angular rotation rate is proportional to the AC signal needed to null the motion of the proof mass 22.

Figure 2:
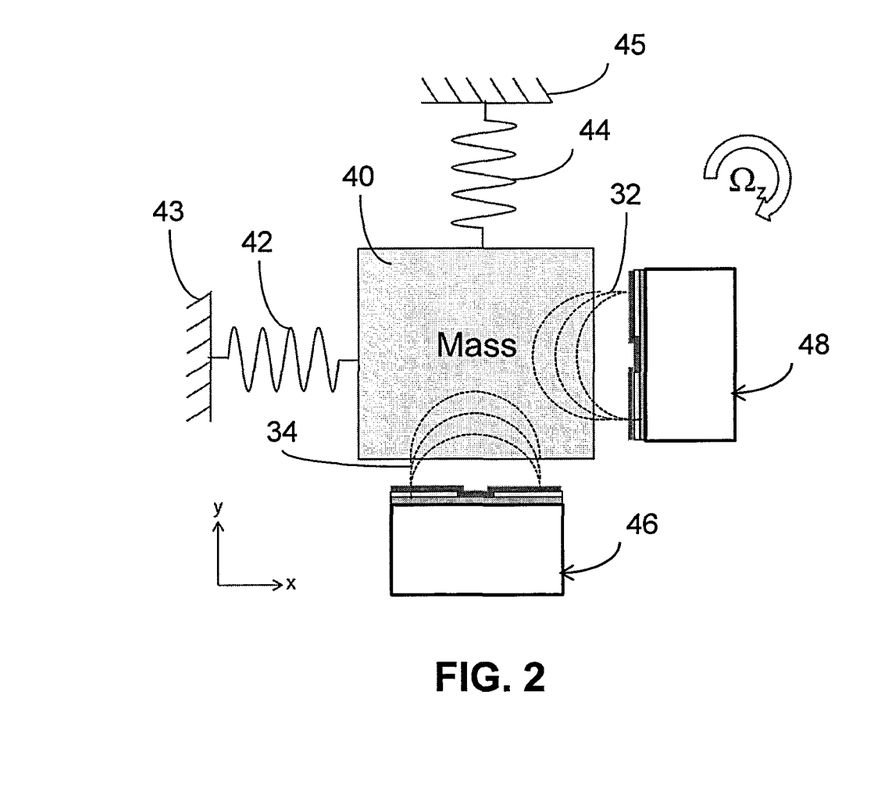
FIG. 2 shows a gyroscope design that senses rotation and rotation rate and that utilizes the electric gradient drive and sense mechanism of FIG. 1 in accordance with present disclosure.

FIG. 2 shows a gyroscope design that senses rotation and rotation rate and that utilizes the electric gradient drive and sense mechanism of FIG. 1 in accordance with present disclosure. A dielectric proof mass 40 is attached to spring 42, which is anchored to anchor 43 in the x direction. The dielectric proof mass 40 is also attached to spring 44, which is anchored to anchor 45, in the y direction. The configuration of FIG. 2 is configured to sense a rotation and rotation rate ($\Omega_z$) about the z-axis.

One electric gradient mechanism 48 is placed in proximity to the proof mass 40 to drive the proof mass 40 in the x direction. Another electric gradient mechanism 46 is placed in proximity to the proof mass 40 in the y direction to sense motion in the proof mass 40. A person skilled in the art would know that the electric gradient mechanism 46 could instead be used to drive the proof mass 40, and the electric gradient mechanism 48 could be used to sense motion in the proof mass 40. A person skilled in the art would also understand that the electric gradient mechanism 46 could be used to both drive and sense the motion of the proof mass 40, and the electric gradient mechanism 48 could also be used to drive and sense motion in the proof mass 40. Each electric gradient mechanisms 46 and 48 may have the same design as electric gradient mechanism 10 of FIG. 1.

An AC voltage between the electrodes in electric gradient mechanism 48 drives the proof mass 40 in the x direction, and the electric gradient mechanism 46 senses motion in the proof mass 40 by sensing the current generated by the motion in the electrodes in electric gradient mechanism 46 by the motion. Alternatively electric gradient mechanism 46 may sense the motion of the mass 40 by applying an AC voltage across the electrodes in electric gradient mechanism 46 at a level necessary to damp the motion of mass 40.

FIGS. 3A to 3D show another gyroscope in accordance with present disclosure. In this embodiment a dielectric micro-shell structure 50 is used, which can vibrate in a wineglass vibrational mode.

Figures 3A, 3B:
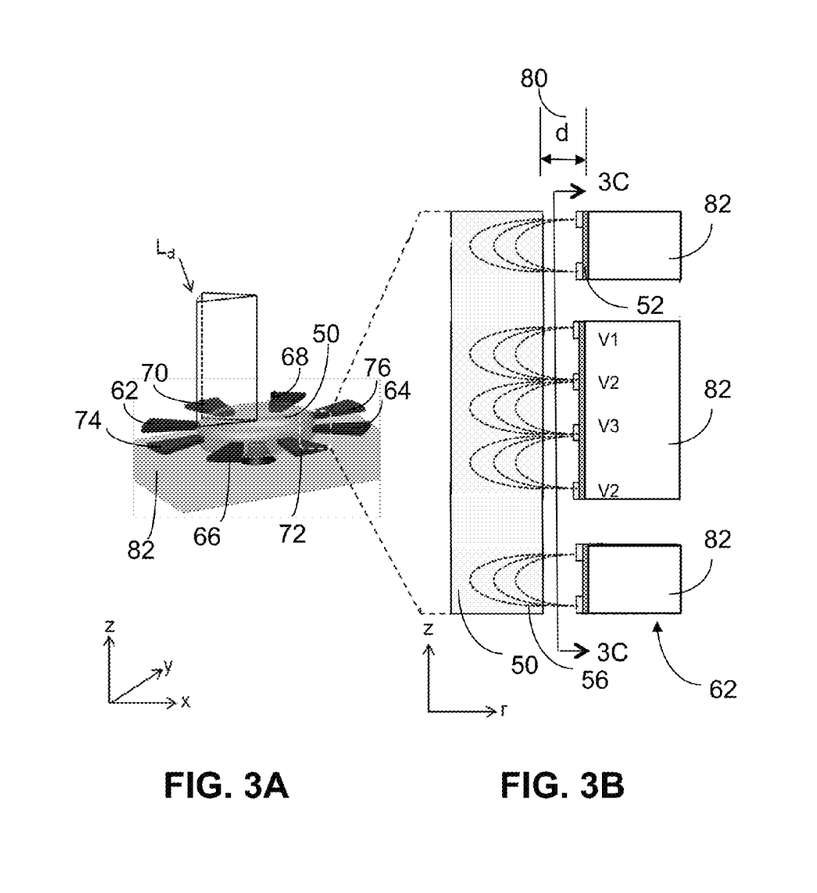
FIGS. 3A to 3D show another gyroscope in accordance with present disclosure.

The dielectric micro-shell structure 50 is driven to vibrate by two sets of opposing drivers or actuators. The first set has a first driver 62 on one side of the periphery of the micro-shell structure 50, and a second driver 64 on the opposite side of the periphery of the micro-shell structure 50. The second set has a third driver 66 located at a 90 degree rotation from the first set on the periphery of the micro-shell structure, and a fourth driver 68 on the opposite side of the periphery of the micro-shell structure 50. Each driver is actuated by an AC voltage between the electrodes in the driver. The two sets of drivers are driven out of phase with each other to excite a wineglass vibrational mode in the dielectric micro-shell structure.

The mechanical modes of the wine glass may be represented by the mass-spring systems of FIGS. 1 and 2. The physical spring in this system is the perimeter of the micro-shell 50 or wine glass as it flexes in a wine glass mode, and the two springs shown in FIG. 2 generally correspond to two orthogonal mechanical modes of the structure. The modes are either degenerate, meaning they have the same frequency, or nearly degenerate, meaning there is a frequency split between them. The mass is the mass of the region of the micro-shell 50 that actually moves, otherwise known as motional mass.

The material of the micro-shell structure 50 is preferably SiO2 or SiN, but can be any dielectric. The micro-shell 50 may have a diameter of 10s of microns to several millimeters. The walls of the micro-shell 50 may be 100s of nanometers to 10s of microns thick. The height of the micro-shell 50 may be a few microns to 1 millimeter. The resonant frequency of the micro-shell 50 may be 1 KHz to 500 KHz. No drive or sense electrodes are on the micro-shell 50, because they would distort the resonant modes of the structure and create asymmetries.

To sense the vibrations in the dielectric micro-shell structure, two sets of sensors are configured in opposing pairs placed 45° rotated from the two sets of drivers. The first set has a first sensor 70 on one side of the periphery of the micro-shell structure 50, and a second sensor 72 on the opposite side of the periphery of the micro-shell structure 50. The second set has a third sensor 74 located at a 90 degree rotation from the first set on the periphery of the micro-shell structure, and a fourth sensor 76 on the opposite side of the periphery of the micro-shell structure 50. Each sensor senses motion by sensing the current generated from the electrodes in the sensor by the vibration of the dielectric micro-shell structure 50. The current is generated by the same principle as discussed above for FIG. 1.

Although the above describes two sets of drivers and two sets of sensors, a person skilled in the art would understand that other configurations of the drivers and sensor may also be used.

A distance (d) 80 away from the micro-shell structure 50 stands a support structure 82 for the drive and sense electrodes. The distance (d) 80 may be 100s of nanometers to 10s of microns. Each driver or sensor, shown in FIG. 3A, may be repeated several times to increase a drive force or to increase sense sensitivity. FIG. 3B shows how one driver, such as driver 62 repeats in the z direction. The height of the support structure 82 may be a few microns to 1 millimeter, which corresponds with the height of the micro-shell 50, which may be a few microns to 1 millimeter.

Figure 3C:
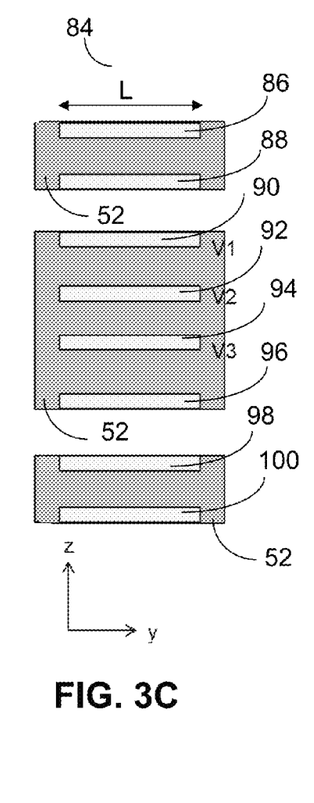
Figure 3D:
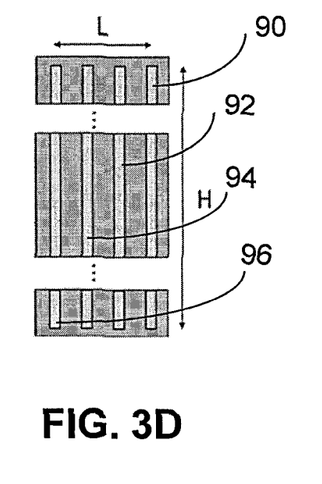

FIG. 3C, which is a sectional view of FIG. 3B, shows the width L 84 of the electrodes 86, 88, 90, 92, 94, 96, 98, and 100 of driver 62. The electrodes are on the inner face of the support structure and face the micro-shell structure. The support structure 82 can be either vertical, as shown in FIG. 3B, or angled, curved, or have a complex topography in the z direction to optimize the drive force and sense sensitivity. Similarly, the electrodes can be either flat, angled or curved, or have a complex topography in the z direction to optimize the drive force and sense sensitivity. The electrodes on may be arranged in a horizontal orientation, as shown in FIGS. 3B and 3C, or have a vertical orientation, as shown for electrodes 90, 92, 94 and 96 in FIG. 3D. The support structure 82 can also be either flat, curved, as shown in FIG. 3A, or have a complex topography in the circumferential direction to optimize the drive force and sense sensitivity. The electrode pattern may also be repeated vertically, as shown in FIG. 3B, horizontally, or in a more complex pattern to increase electric field strength and gradient. An insulating layer 52 is between the electrodes and the support structure 82 to prevent current leakage through the support structure 82. Similarly to the embodiment of FIG. 1, the electrodes may be covered by a dielectric layer in order to increase the breakdown voltage between the two adjacent electrodes. The electric fields 56 from the electrodes extend into the dielectric micro-shell structure 50.

Repetition of a driver or sensor allows for several voltage configurations that may be applied across the electrodes. Table 1 lists some of the possible voltage configurations, for the configuration of FIG. 3B. A person skilled in the art would understand that there are many more possible voltage configurations.

TABLE 1

|        | V1 | V2 | V3 |
|--------|----|----|----|
| Case 1 | +V | −V |    |
| Case 2 | +V | 0  | −V |
| Case 3 | V  | 0  | V  |

Figures 4A, 4B:
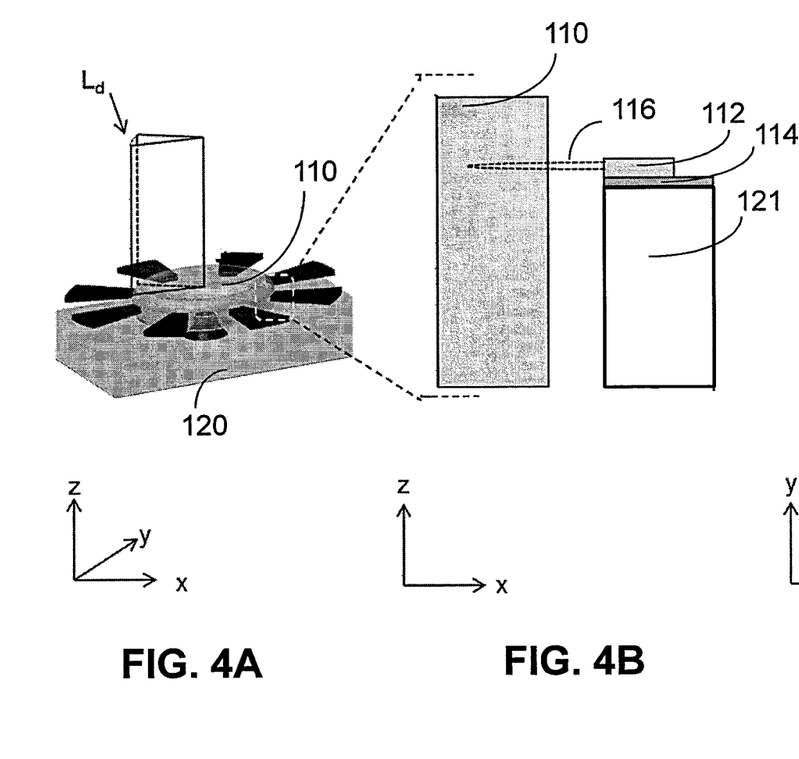
FIGS. 4A to 4C show yet another gyroscope in accordance with present disclosure.
Figure 4C:
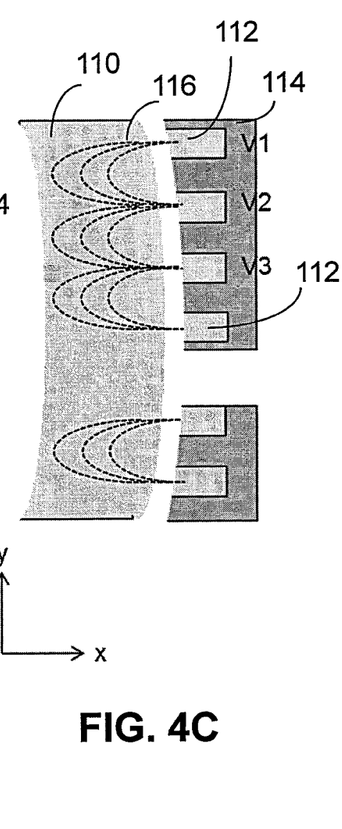

FIGS. 4A to 4C show another embodiment of a gyroscope in accordance with present disclosure that uses a dielectric micro-shell structure 110 supported by a substrate 120. The configuration of FIGS. 4A-4C may be easier to fabricate than the configuration shown in FIGS. 3A-3D. In the configuration of FIG. 4A-4C, the drivers and sensors are located at a distance along the periphery of the dielectric micro-shell structure 110 in a manner similar to that described for FIG. 3A; however in the embodiment of FIGS. 4A-4C the electrodes, such as electrode 112 shown in FIG. 4B, are fabricated on top of the support structure 121. An insulating layer 114 is between the electrodes, such as electrode 112 and the support structure 121 to prevent current leakage through the support structure 121.

As shown in FIG. 4C, the electrodes 112 are arranged on top of the support structure 121 and arranged in a horizontal plane around the periphery of the dielectric micro-shell structure 110. The electric fields 116 from the electrodes extend into the dielectric micro-shell structure 110. There is a separation between adjacent drivers and/or sensors.

Finite element simulations and calculations for the driver/sensor structure of FIG. 1 and FIG. 3A have been performed. The distance between the dielectric mass and the drivers or sensors may vary between 0 and 20 um, or between 100s of nanometers to 10s of microns. Depending on the distance, the driver/actuator is able to drive the mechanical motion of the mass with a force ranging from nano-newtons to as high as a milli-newton of force. Such force levels are sufficient to drive the dielectric mass to have a motion ranging from a submicron to 10s of microns. The drive and sense voltages (V), shown in Table 1, range between 0 and +/−100V. The size of the drive and sense mechanisms may be in a range of microns to millimeters.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . ".

What is claimed is:

1. An apparatus for a gyroscope comprising:
   a dielectric mass;
   an anchor;
   a spring coupled between the anchor and the dielectric mass, wherein the spring between the anchor and the dielectric mass has a first orientation;
   a substrate adjacent the dielectric mass, wherein the substrate is in a plane that has an orthogonal orientation to the first orientation of the spring; and
   a first electrode and a second electrode on the substrate;
   wherein the apparatus is configured so that when an alternating current voltage is applied between the first and second electrodes, an electric field gradient is generated in the dielectric mass, and when the alternating current voltage has a frequency matching or near a resonant frequency of the apparatus, the dielectric mass has an oscillation relative to the anchor; and
   wherein the apparatus is configured so that when a voltage is applied between the first and second electrodes, a charged capacitor is formed by the first and second electrodes, and a motion of the dielectric mass generates a current at the first and second electrodes proportional to the motion of the dielectric mass.

2. The apparatus of claim 1 further comprising a dielectric layer covering the first and second electrodes to increase a breakdown voltage between the first and second electrodes.

3. The apparatus of claim 1 wherein the gyroscope is a micro-electrical mechanical systems gyroscope.

4. The apparatus of claim 1 wherein the alternating current voltage applied between the first and second electrodes has a frequency matching or near a resonant frequency of a mechanical resonator comprising the dielectric mass, the anchor, and the spring.

5. The apparatus of claim 1 wherein the first and second-electrodes are coupled to a low noise amplifier to increase sensitivity.

6. A gyroscope for sensing a motion comprising:
   a mass spring system in a conventional Cartesian x, y, z coordinate system wherein an x, a y, and a z direction are mutually orthogonal to each other, the mass spring system comprising:
      a dielectric mass;
      a first anchor;
      a first spring coupled between the first anchor and the dielectric mass, the first spring oriented along the x direction;
      a second anchor; and
      a second spring coupled between the second anchor and the dielectric mass, the second spring oriented along the y direction;
   a first substrate adjacent the dielectric mass in the x direction opposite the first anchor; and
   a first electrode and a second electrode on the first substrate;
   a second substrate adjacent the dielectric mass in the y direction opposite the second anchor; and
   a third electrode and a fourth electrode on the second substrate;
   wherein the gyroscope is configured so that when an alternating current voltage having a frequency matching or near a resonant frequency is applied between the first and second electrodes, the dielectric mass has a sustained oscillation, and an electric field gradient is generated in the dielectric mass and causes the dielectric mass to move relative to the first and second anchors; and
   wherein the gyroscope is configured so that when a voltage is applied between the third and fourth electrodes, the sustained oscillation of the dielectric mass generates a current at the third and fourth electrodes proportional to the motion of the dielectric mass.

7. The gyroscope of claim 6 further comprising:
   a first dielectric layer covering the first and second electrodes to increase a breakdown voltage between the first and second electrodes; and
   a third dielectric layer covering the third and fourth electrodes to increase a breakdown voltage between the third and fourth electrodes.

8. The gyroscope of claim 6 wherein the gyroscope is a micro-electrical mechanical systems gyroscope.

9. The gyroscope of claim 6 wherein the alternating current voltage applied between the first and second electrodes has a frequency matching or near a resonant frequency of a mechanical resonator comprising the dielectric mass, the first anchor, and the first spring.

10. A micro-electrical mechanical systems (MEMS) gyroscope comprising:
    a dielectric micro-shell, wherein no electrodes are on or in the dielectric micro-shell, and wherein the dielectric micro-shell has a first height;

a first set of drivers comprising:
   a first driver on a side of a periphery of the dielectric micro-shell; and
   a second driver on a side of the periphery of the dielectric micro-shell opposite the first driver;
a first set of sensors placed 45° rotated from the first set of drivers comprising:
   a first sensor on one side of the periphery of the dielectric micro-shell; and
   a second sensor on a side of the periphery of the dielectric micro-shell opposite the first sensor;
a support structure adjacent the periphery of the dielectric micro-shell for supporting the electrodes for the first driver and second driver, the support structure having a second height that is the same as the first height;
an insulator on the support structure;
wherein the electrodes for each driver are on the insulator and on a face of the support structure that faces the dielectric micro-shell, and are arranged along the height of the support structure;
wherein each driver is actuated by an alternating current voltage between electrodes in the driver;
wherein the first driver and the second driver are driven out of phase with each other to excite a wineglass vibrational mode in the dielectric micro-shell;
wherein each sensor senses motion in the dielectric micro-shell by applying a voltage to electrodes in the sensor and sensing current generated from the electrodes by the vibration of the dielectric micro-shell; and
wherein the drivers and sensors are not on the dielectric micro-shell.

11. The MEMS gyroscope of claim 10 further comprising:
a second set of drivers located at a 90 degree rotation along the periphery of the dielectric micro-shell from the first set of drivers comprising:
   a third driver on one side of the periphery of the dielectric micro-shell; and
   a fourth driver on a side of the periphery of the dielectric micro-shell opposite the third driver; and
a second set of sensors located at a 90 degree rotation along the periphery of the dielectric micro-shell from the first set of sensors comprising:
   a third sensor on one side of the periphery of the dielectric micro-shell; and
   a fourth sensor on a side of the periphery of the dielectric micro-shell opposite the third sensor.

12. The MEMS gyroscope of claim 11 wherein:
a plurality of drivers are at each location for a driver to increase a drive force; and
a plurality of sensors are at each location for a sensor to increase sensitivity.

13. The MEMS gyroscope of claim 11 further comprising:
wherein the electrodes for each driver and sensor are on the insulator on a face of the support structure that faces the dielectric micro-shell.

14. The MEMS gyroscope of claim 13 wherein:
a distance between the dielectric micro-shell and the drivers or sensors ranges between 100s of nanometers to 10s of microns.

15. The MEMS gyroscope of claim 11 wherein:
voltages at the electrodes of the drivers and sensors range between 0 volts and +100 volts or −100 volts.

16. The MEMS gyroscope of claim 11 wherein:
a size of each driver ranges from microns to millimeters; and
a size of each sensor ranges from microns to millimeters.

17. The MEMS gyroscope of claim 13 wherein:
the support structure is vertical, angled, curved, or has a complex topography relative to the periphery of the dielectric micro-shell to increase a drive force and a sense sensitivity; and
the electrodes are vertical, horizontal, flat, angled or curved.

18. The MEMS gyroscope of claim 13 wherein:
the support structure is flat, curved, or has a complex topography in a circumferential direction relative to the periphery of the dielectric micro-shell to optimize a drive force and a sense sensitivity; and
the electrodes are vertical, horizontal, flat, angled or curved.

19. The MEMS gyroscope of claim 11 wherein the electrodes in each driver are covered by a dielectric layer in order to increase a breakdown voltage between two adjacent electrodes.

20. The MEMS gyroscope of claim 11 further comprising:
an insulator on top of the support structure;
wherein the electrodes for each driver and sensor are on the insulator on top of the support structure.

21. The MEMS gyroscope of claim 20 wherein the electrodes arranged on top of the support structure are arranged in a horizontal plane around the periphery of the dielectric micro-shell with a separation between adjacent drivers and/or sensors.

22. The MEMS gyroscope of claim 10:
wherein the dielectric micro-shell has a diameter, the diameter being from 10s of microns to several millimeters;
wherein walls of the dielectric micro-shell have a thickness, the thickness being from 100s of nanometers to 10s of microns; and
wherein the dielectric micro-shell has a height, the height being from a few microns to 1 millimeter.

23. The apparatus of claim 1 further comprising:
an insulator layer on the substrate;
wherein the first electrode and the second electrode are on the insulator layer.

24. The gyroscope of claim 6 further comprising:
a first insulator layer on the first substrate, wherein the first electrode and the second electrode are on the first insulator layer; and
a second insulator layer on the second substrate, wherein the third electrode and the fourth electrode are on the second insulator layer.

25. The MEMS gyroscope of claim 10 wherein the resonant frequency of the dielectric micro-shell ranges from 10 KHz to 500 KHz.

* * * * *